United States Patent [19]

Babcock

[11] 3,942,329
[45] Mar. 9, 1976

[54] FLEXIBLE ROCK BOLT
[75] Inventor: Clarence O. Babcock, Lakewood, Colo.
[73] Assignee: The United States of America as represented by the Secretary of the Interior, Washington, D.C.
[22] Filed: Feb. 11, 1975
[21] Appl. No.: 549,126

[52] U.S. Cl............... 61/45 B; 52/698; 85/20; 85/64
[51] Int. Cl.² .............. E21D 20/02; F16B 13/04
[58] Field of Search........... 61/45 B, 39; 85/64, 20, 85/21, 63; 52/698

[56] References Cited
UNITED STATES PATENTS

| | | | |
|---|---|---|---|
| 2,690,693 | 10/1954 | Campbell | 61/45 B X |
| 3,394,527 | 7/1968 | McLean | 61/45 B X |
| 3,478,640 | 11/1969 | Elders | 85/64 |
| 3,653,217 | 4/1972 | Williams | 61/45 B |
| 3,698,196 | 10/1972 | Jankowski et al. | 61/45 B |

Primary Examiner—Jacob Shapiro
Attorney, Agent, or Firm—Gersten Sadowsky; Donald R. Fraser

[57] ABSTRACT

A flexible rock bolt for use in anchoring mine structures to ground formations and in supporting such structures which consists of a rock bolt helically coiled into a spring shape having relatively large pitch and a spring index of at least two which allows the rock bolt to elongate upon application of tension and torsion loading and allows the rock bolt to contract under compression.

4 Claims, 6 Drawing Figures

U.S. Patent  March 9, 1976  3,942,329
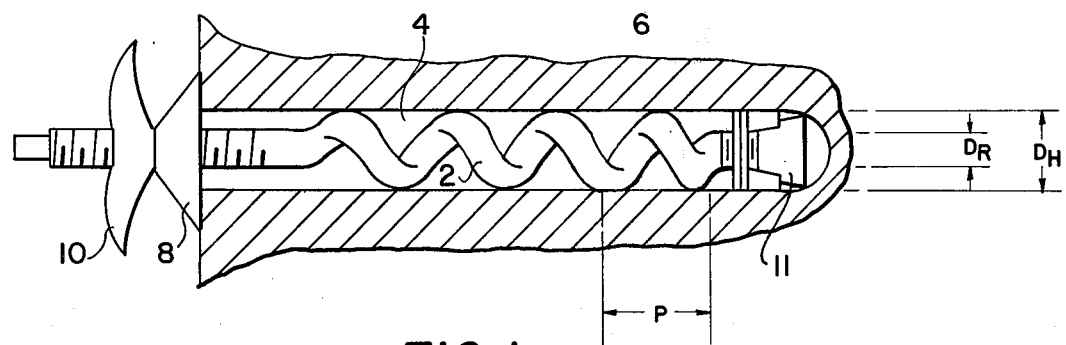
FIG. 1
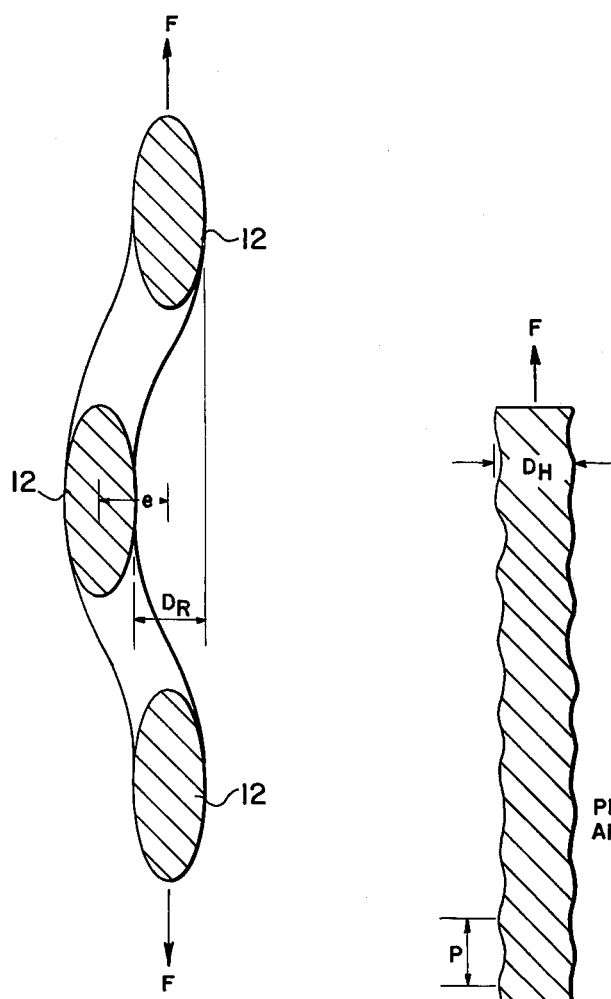
FIG. 3
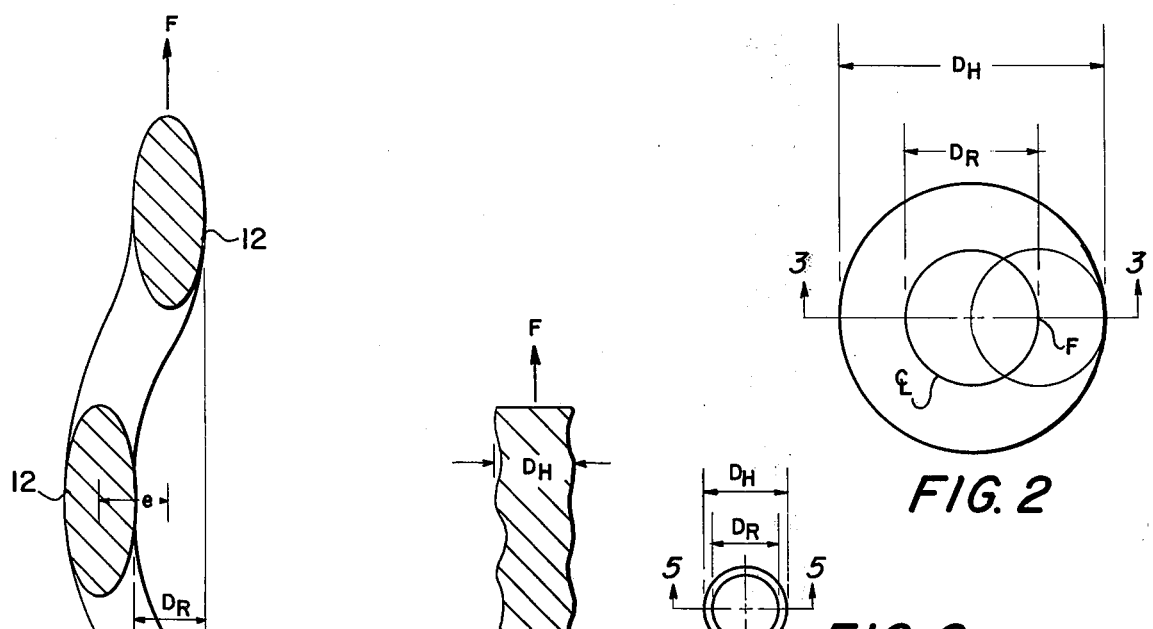
FIG. 2
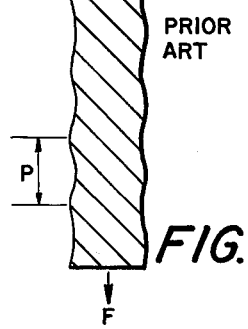
FIG. 5 PRIOR ART
FIG. 6
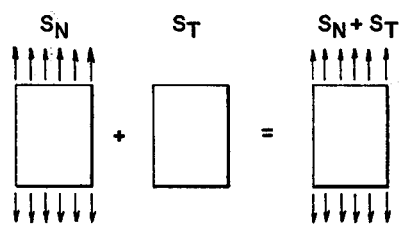
FIG. 4

FLEXIBLE ROCK BOLT

This invention relates to mining and related constructions and particularly to rock bolts for use therein. Rock bolts are typically used to attach and/or reinforce portions of a mine shaft formation to itself or to the rock formation. Rock bolts are typically placed in holes bored into the rock formation and they may be anchored therein to secure sections of rock formation together. When attached to the rock formation the rock bolts may further serve to support the parts of the mine structure which are thereafter formed.

Rock bolts are typically used primarily as anchors and also as reinforcing bars when concrete and other grouts are poured around the bolts during formation of the mine structure. In either use the bolts are typically from 5 to 50 or more feet in length and will be subject to tremendous pressures when the rock formation shifts due to natural shifting of the rock or to subsequent tunnel blasting and boring. If it is desired to utilize the bolt anchored to the structure as a reinforcing bar the grout is poured around it after installing the bolt in a hole in a pre-stressed condition. The grout holds the bolt and also transfers forces to the rock formation. The forces acting on the bolts are very large in either use and should the forces exceed the ultimate strength of the bolt failure of the mine structure and cave-in can result.

Although the problem of shifting of the supported structures has been recognized it was typical to use rigid rock bolts and to use anchors which had some degree of flexibility but were rigidly encased in grouting. It was generally the purpose and desire of the art to avoid any but the slightest movement in a secured rock bolt. The bolts were strengthened so that their strength approximated the yield point of the bolt by cold working and other methods designed to increase the load which the bolts could bear.

As just mentioned some limited degree of flexibility was provided in the bolts. This was generally found in structures intended as reinforcing elements. It was essential when grouting a bolt to secure the bolt to the grout in order that the forces transmitted by the bolt to the grout would be evenly distributed thereby avoiding local failure of the grout. Such efforts generally resulted in providing a rock bolt with corrugations, undulations and other protrusions which anchor the bolt to the grout. One particular effort in this regard is illustrated in U.S. Pat. No. 3,653,217 wherein protrusions are provided on a rock bolt surface at no more than a 15° angle to provide for a wedging action upon movement of the bolt in the grout. Another is shown in U.S. Pat. No. 3,160,988 where some flexibility of a rock bolt is provided via undulations which vary in pitch along the bolt length. However, in spite of these bolts which provide some limited degree of movement of the bolt in the grout it was generally assumed that a rigid rock bolt installed in a stressed condition was necessary to adequately support a mine structure. If the load changed by increasing the grout was felt to provide some transmission by distribution of the stresses, and if the load decreased, the rigidity of the bolt itself would resist contraction.

Because of the rigidity of the art's rock bolts, changes in the rock formation cannot be accommodated adequately. If the change is such as to remove load from the bolt, the bolt should desirably recover or contract elastically and continue to support the formation and conversely if the shift is such as to add load to the bolt the bolt should elastically extend to accommodate the new load. Quite clearly the prior art structures could not provide this adaptability because of their rigidity except in the slightest changes of load. Even adjustable anchors do not protect against sudden changes of load. In this field, either extreme, removing all load or exceeding the breaking load, are equally disastrous as no support of the rock structure by the rock bolt is provided.

Now in accordance with this invention it has been discovered that provision of a helical flexible rock bolt will allow greater strength and load and also much better load accommodation upon shift in the load. This invention provides a rock bolt intended primarily for use as an anchor but which can also be grouted for use as a reinforcing bar when a flexible grout is provided. In summary the rock bolts of this invention provide a helical shape with a spring index of at least two. Spring index as used herein is defined as the ratio of the helical outside diameter to the diameter of the rod forming the rock bolt. Furthermore the helical rock bolt of this invention must have a large pitch preferably 10 to 20 times the rock bolt diameter. A lesser pitch results in a "flat" spring which under torsional load flattens out before the ultimate strength of the bar forming the spring is reached. The number of turns of the helix for a given length can be varied to control the extensibility and strength of the helix. By use of this structure the bolt is flexible and adaptable to unusually great changes in load. Under changes of load this bolt automatically adjusts and supports immediately without need to mechanically adjust the anchor when, and if, discovered. Under tension and torsion resulting from an increased load the bolt may extend many times that extension experienced by a commonly used relatively rigid rock bolt. Under such loading, tension, in the direction of the axis, and torsion, in a plane normal to the axis, are experienced upon a change in load. The rock bolt of the invention has a tri-axial state of stress that gives greater strain energy in the bar within the elastic limits of the material than is possible with the prior art bolts where the normal and most of the shearing stresses act in the same plane in the direction of the rod length. Under compression quite clearly the prior art rock bolt can only contract to the extent that it has been elastically deformed and this is an exceedingly small portion of its overall length. On the contrary the helical rock bolt of this invention can be compressed many times the compression experienced by prior art bolts.

The invention will be more fully understood by reference to the annexed drawings wherein:

FIG. 1 is an elevation view of a rock bolt section showing the helical rock bolt of this invention, FIG. 2 shows a top view of the bolt of FIG. 1, FIG. 3 shows a sectional view along lines 3—3 of FIG. 2, FIG. 4 shows the forces acting on the bolt of FIGS. 1 through 3 during loading, FIG. 5 illustrates a typical prior art bolt in cross-section taken along lines 5—5 of FIG. 6, FIG. 6 is a top view of the prior art bolt shown in FIG. 5.

Referring more specifically to FIGS. 1 through 4 a rock bolt 2 of FIG. 1 is shown as a somewhat exaggerated helix placed in a hole 4 in a rock formation 6 having a surface plate 8 and nut assembly 10 at one end securing the bolt and the rock formation together. At the other end conventional anchoring means 11, i.e., as depicted in the aforementioned U.S. Pat. No. 3,653,217 may be provided which are activated as known to the art by tightening nut 10. The rod diameter $D_R$ is shown in FIG. 1 as well as the helical diameter $D_H$ which latter diameter is at least twice the former diameter. The pitch, P, shown is variable but is preferably 10 to 20 times $D_R$ and about 4 to 8 times $D_H$. In FIG. 2 the relation of the diameters is quite clearly shown. In FIG. 2, L is the centerline or axis of the helix on which load F acts. Referring now to FIG. 3 a section along line 3—3 of FIG. 2 illustrates the forces acting in the rock bolt. In FIG. 3 the offset from center or eccentricity of F is designated $e$. The eccentricity of the helix is greater than the rod diameter by reason of the specification that the spring index must be at least 2. The section 3—3 then cuts the rod in the shaded areas and these areas are separate and able to move relative to one another under load. The torsion acting on these areas when a force acts with an eccentricity e across the coil width twists the rod between the forces so that the coil tends to unwind like a tension spring when stretched. The resulting stresses on a cross-section of rod of circular shape (not the elliptical cross-sections of the shaded areas) are a normal stress $S_N$ acting in the centerline direction of the rod and a torsional stress $S_T$ acting normal to the normal stress. These force components are shown in FIG. 4. Because of the helical shape and size of the offset which produces free and isolated elliptical sections 12 the force component $S_N$ and $S_T$ do not add as they would in other bolt formations. The torque produced in the structure of FIG. 3 by a force F on the axis of the bolt is F times e or $S_T$. The torque causes an untwisting action in a plane normal to the stress $S_N$ which allows great extension of the bolt length. If the load is decreased the spring simply contracts with a corresponding reduction in the stresses in the bolt but as previously mentioned the amount of contraction available with the rock bolt of this invention is 10 to 20 times that of the previous used bolts.

Referring to FIGS. 5 and 6 the most analogous prior art structure is shown which is provided with a helical undulation similar to a screw thread on a basically straight and rigid rock bolt. Here if it were considered that this structure has a spring index the spring index would be, for a 1 inch diameter rod having an outer helical diameter of 1.07 inches, only 1.07. Similarly the ratio of pitch to rod diameter is slightly over 1.

The advantages of the rock bolt of the instant invention are considered fairly apparent but as opposed to a straight or untreated rock bolt it is quite clear that in a straight rod of circular cross-section upon application of stress in an axial direction by a force F the limit of the rod in terms of the normal stress over any cross-section is the elastic limit of the material. If F is increased beyond that point the rod will be permanently deformed and will be ultimately broken. If F is decreased the rod will recover to its unloaded shape but no more. An undulating rod of circular cross-section loaded with the same force F will be subject to a normal stress across the cross-section and a bending stress which add according to principles of mechanics on one side of the bar and substract on the opposite side. On the side where the stresses add as tension forces the stress will exceed the elastic limits and the rod will be permanently deformed. Upon decreasing the load again the rod only assumes its unloaded shape. Considering the modified bolt of FIGS. 5 to 6, upon application of an axial force F the section 5—5 is loaded primarily by normal stress. There will be minor bending stresses and torsion stresses (due to the small eccentricity) but the normal stress almost completely controls the behavior of the rock bolt. Before any significant torsional stress is produced the normal stress has exceeded the elastic limits of the material. Therefore for practical purposes the bar of FIGS. 5 to 6 acts as a straight bar and simply breaks upon exceeding the elastic limit of the bar and on decreasing of load simply assumes its unloaded position.

From this hypothetical example it is quite clear that the helical rock bolt of the present invention is much more adaptable and can accommodate substantially larger variations in loads than any known prior art rock bolt. In extension under increased load there are several important reasons why the unusually long elastic extension of the rock bolt of this invention is desirous. If a mine structure deforms so as to remove the bolt load the work that a straight bolt can do on the structure before it becomes unloaded is F times e or for example 8,000 pounds times 0.07 (for the illustrated prior art structure) or 560 inch pounds of work. On the other hand the bolt of this invention can perform even with a 9/16 inch diameter rock bolt 8,000 times about 0.75 or 6,000 inch pounds of work. The difference is in the eccentricity where the eccentricity of this invention is always greater than the bolt diameter but the eccentricity of the most analogous prior art is a minor fraction of the bolt diameter. Furthermore if the normal bolt length is changed under load even 0.072 inches from the 8,000 pound loaded condition the load will change from 0 to 16,000 pounds neither of which is desirable. The invented bolt however will change its load only plus or minus 10% for the same change in length to from 7200 to 8800 pounds. This type behavior where the bolt flexes with the change in structure geometry is very desirable to maintain good ground control behavior in the mining process where changes due to blasting and mining operations occur.

The materials of construction and relative sizes are not intended to in any way limit the invention. Steel rock bolts and anchors are desirable and they may or may not be cold worked prior to formation into the helix of this invention. In formation, a steel rod of e.g. 1.0 inch diameter may be wound into a tight helix with the ends left straight. The ends may be threaded or upset to form a bolt head. Then a force is applied to the ends tending to straighten the helix and elongate the bolt to the desired, reduced helix. After formation the reduced helix should be annealed or tempered. Any other material can also be used and any anchoring means can be used. The diameter of the rock bolt will typically be a 1 inch diameter or a 9/16 inch diameter stock material. A 9/16 inch bolt coiled with a pitch of 9 inches and a helical diameter of 1.5 inches has been used but it is intended to encompass any and all dimensions within the invention's limits. Similarly the cross-section of the rock bolt is immaterial and it is possible to use either a circular, square, rectangular, or other cross-sectional shape which is preferably solid. The only material which affects the invention as disclosed is the grout. It is not believed to be desirable to utilize rigid grout such as concrete in connection with the helical rock bolt of this invention since such grouts would unduly limit and restrict the movement desired under load change. There are however flexible grouts known to the art which could be utilized. The particular chemical composition of the grout is not material so long as the grout may flex and accommodate the changes in bolt shape under changes in load. For this purpose the grout, when set, should have sufficient elasticity to allow relatively free extension or compression of the rock bolt. Foamed grouts are preferred because of their compressibility. Epoxy grouts may be used as one embodiment. Grouts may or may not be used with the instant invention but when used, for example to provide temporary additional support or to prevent water seepage, they should be of a flexibility as aforesaid.

Having described my invention what is claimed is:

1. In a combination of a ground formation wherein an inner surface constitutes a borehole extending from an outer surface thereof, a rock bolt, and means affixing said rock bolt to said ground formation, said rock bolt having an elongated portion thereof disposed within said borehole in longitudinal alignment therewith, said portion being a rod element having a substantially uniform, generally circular cross-sectional area and a form characterizable as a flexible helix of a substantially uniform diameter throughout and a pitch that is large relative to a diameter of said rod element wherefore the spring index of said rod element is greater than 2, and said means affixing comprising first and second means securing said bolt to said inner and outer surfaces of said formation, respectively.

2. The combination of claim 1 wherein said spring index is from about 2.3 to about 2.8.

3. The combination of claim 1 wherein said first means securing includes a mass of flexible grout packed between said rod element and said inner surface of said ground formation and an anchor means at an end of said rod element within said borehole, and said second means securing includes a plate on an end of said rod element outside said borehole and in contact with said outer surface, and a nut on said outside end normally bearing against said plate.

4. The combination of claim 1 wherein said pitch of the helix is from about 10 to about 20 times said rod diameter.

* * * * *